United States Patent
Oda et al.

(10) Patent No.: US 11,186,311 B2
(45) Date of Patent: Nov. 30, 2021

(54) CONTROL CIRCUIT AND MOTOR CONTROL DEVICE

(71) Applicants: JTEKT CORPORATION, Osaka (JP); RENESAS ELECTRONICS CORPORATION, Tokyo (JP)

(72) Inventors: Masato Oda, Okazaki (JP); Kenichi Kozuka, Chita (JP); Hiromasa Suzuki, Tokyo (JP); Masashi Oki, Tokyo (JP)

(73) Assignees: JTEKT CORPORATION, Osaka (JP); RENESAS ELECTRONICS CORPORATION, Tokyo (JP)

( * ) Notice: Subject to any disclaimer, the term of this patent is extended or adjusted under 35 U.S.C. 154(b) by 42 days.

(21) Appl. No.: 16/795,691

(22) Filed: Feb. 20, 2020

(65) Prior Publication Data
US 2020/0269904 A1    Aug. 27, 2020

(30) Foreign Application Priority Data
Feb. 21, 2019   (JP) .............................. JP2019-029635

(51) Int. Cl.
  *B62D 5/04* (2006.01)
  *B62D 15/02* (2006.01)

(52) U.S. Cl.
  CPC ............ *B62D 5/049* (2013.01); *B62D 5/046* (2013.01); *B62D 5/0487* (2013.01); *B62D 15/021* (2013.01)

(58) Field of Classification Search
  CPC ..................................................... B62D 5/049
  See application file for complete search history.

(56) References Cited

U.S. PATENT DOCUMENTS

| 7,200,515 B2 * | 4/2007 | Sakabe .............. B62D 15/0215 180/444 |
| 9,477,994 B2 * | 10/2016 | Lin ...................... H04L 67/1059 |
| 11,014,603 B2 * | 5/2021 | Kozuka ................ B62D 5/0481 |
| 11,018,611 B2 * | 5/2021 | Nakashima ............. H02P 21/06 |
| 2015/0367887 A1 | 12/2015 | Fujita et al. |
| 2019/0346287 A1 * | 11/2019 | Koike ................ B62D 15/0235 |
| 2020/0269904 A1 * | 8/2020 | Oda ....................... B62D 5/046 |

FOREIGN PATENT DOCUMENTS

| EP | 2960141 A1 | 12/2015 |
| EP | 3444583 A1 | 2/2019 |
| JP | 2012-046047 A | 3/2012 |
| JP | 2016-005918 A | 1/2016 |

OTHER PUBLICATIONS

Feb. 3, 2021 Search Report issued in European Patent Application No. 20158711.0.

* cited by examiner

*Primary Examiner* — Michael A Berns
(74) *Attorney, Agent, or Firm* — Oliff PLC (57) ABSTRACT

A control circuit connected to a control device configured to control a motor connected to a rotation shaft that is convertible into a turning angle of a turning wheel, the control circuit includes a main circuit configured to calculates a rotation number indicating a rotational state of the rotation shaft based on a detection signal from a rotation angle sensor configured to detect a rotation angle of the motor as a relative angle, a detection result communication unit configured to detect whether or not there is an abnormality in the main circuit and output a detection result to the control device, and a pseudo abnormality generating unit configured to set the detection result to be abnormal based on a pseudo abnormal signal from the control device.

8 Claims, 5 Drawing Sheets

CONTROL CIRCUIT AND MOTOR CONTROL DEVICE

CROSS REFERENCE TO RELATED APPLICATIONS

This application claims priority from Japanese Patent Application No. 2019-029635 filed on Feb. 21, 2019, the entire contents of which are incorporated herein by reference.

BACKGROUND OF THE INVENTION

Field of the Invention

The present invention relates to a control circuit and a motor control device.

Description of Related Art

Conventionally, a steering device such as an electric power steering device (EPS) that applies an assist force to assist steering using a motor as a drive source includes a rotation angle detection device that detects a steering angle of a steering wheel with an absolute angle including a range exceeding 360 degrees. As the rotation angle detection device, there has been known a device that detects a steering angle based on a rotation angle of a motor detected as a relative angle within a range of 360 degrees and a rotation speed of the motor from a steering neutral position (see, for example, the patent document 1: JP-A-2016-5918).

The rotation angle detection device of patent document 1 includes a control circuit that detects whether the rotation angle of the motor is positioned in a quadrant (first to fourth quadrant) obtained by dividing a rotation range of the motor into four, based on a detection signal from a rotation angle sensor that detects the rotation angle of the motor, detects a rotation direction of the motor based on a transition of the quadrant of the rotation angle, and counts a count value indicating the rotation speed of the motor. Further, a control device (microcomputer) calculates the steering angle indicated by an absolute angle based on the rotation angle of the motor and the count value.

The rotation angle detection device of the patent document 1 includes an abnormality detection circuit that detects whether or not there is an abnormality in each circuit included in the control circuit, based on, for example, whether or not a difference between the count value in the latest calculation cycle and a value at preceding time is a value corresponding to the rotation direction of the motor. As a result, the steering angle is prevented from being calculated based on the count value that is erroneously calculated in a state where there is an abnormality in each circuit.

[Patent Document 1] JP-A-2016-5918

According to a related art, no consideration is given to a case where there is an abnormality in a communication of a detection result output from the abnormality detection circuit. For example, in a case where there is an abnormality in each circuit, and the detection result is communicated, when there is an abnormality in the communication, the detection result may not be communicated as it is. That is, since there is an abnormality in communication even though there is an abnormality in each circuit, the control device may not be able to detect an abnormality in the count value calculated by the control circuit, and in this case, there is a possibility that an accurate steering angle cannot be calculated.

The problem is not limited to the case of detecting the steering angle, and may occur in a steer-by-wire type steering device, for example, in a case where a rotation angle of a rotation shaft that is convertible into a turning angle of a turning wheel is detected with an absolute angle based on a rotation angle of a motor used as a drive source of a turning actuator that turns the turning wheel. In a case where the pseudo abnormality generating unit accepts the pseudo abnormal signal from the control device, the pseudo abnormality generating unit sets the detection result output from the detection result communication unit to be abnormal and outputs the detection result to the control device.

SUMMARY

In an aspect (1), one or more embodiments provide a control circuit connected to a control device configured to control a motor connected to a rotation shaft that is convertible into a turning angle of a turning wheel. The control circuit includes a main circuit configured to calculates a rotation number indicating a rotational state of the rotation shaft based on a detection signal from a rotation angle sensor configured to detect a rotation angle of the motor as a relative angle, a detection result communication unit configured to detect whether or not there is an abnormality in the main circuit and output a detection result to the control device, and a pseudo abnormality generating unit configured to set the detection result to be abnormal based on a pseudo abnormal signal from the control device.

According to the aspect (1), the control device can detect an abnormality of the detection result communication unit based on the pseudo abnormal signal output to the pseudo abnormality generating unit and the detection result accepted due to the output of the pseudo abnormal signal to the pseudo abnormality generating unit. If there is an abnormality in the detection result communication unit, the control device acquires the detection result indicating there is no abnormality in the main circuit, in spite of the output of the pseudo abnormal signal to the pseudo abnormality generating unit. As a result, the control circuit can correctly output information on whether or not there is an abnormality in the main circuit to the control device, and the control device can execute calculation based on the correct information, so that a reliability of the control circuit can be improved.

In an aspect (2), the detection result communication unit may include an abnormality detection circuit configured to detect whether or not there is an abnormality in the main circuit, and a communication interface configured to output the detection result of the abnormality detection circuit to the control device. In the case where the pseudo abnormality generating unit accepts the pseudo abnormal signal from the control device, the pseudo abnormality generating unit may cause the abnormality detection circuit to generate the detection result indicating that the main circuit is abnormal.

According to the aspect (2), the control device can detect the abnormality of the communication interface based on whether or not the control device can acquire the detection result indicating there is an abnormality in the main circuit generated in the abnormality detection circuit due to the output of the pseudo abnormal signal to the pseudo abnormality generating unit.

In addition, in a case where the control device acquires the detection result indicating there is an abnormality in the main circuit due to the output of the pseudo abnormal signal to the pseudo abnormality generating unit, the control device can grasp that there is no abnormality not only in the communication interface but also in the abnormality detection circuit.

In an aspect (3), the detection result communication unit may include an abnormality detection circuit configured to detect whether or not there is an abnormality in the main circuit, and a communication interface configured to output the detection result of the abnormality detection circuit to the control device. In the case where the pseudo abnormality generating unit accepts the pseudo abnormal signal from the control device, the pseudo abnormality generating unit causes the communication interface to output the detection result indicating that the main circuit is abnormal.

According to the aspect (3), the control device can detect the abnormality of the communication interface based on whether or not the control device can acquire the detection result indicating there is an abnormality in the main circuit output from the communication interface due to the output of the pseudo abnormal signal to the pseudo abnormality generating unit. In addition, there is a case where the abnormality detection circuit cannot create a detection result indicating there is an abnormality in the main circuit in a pseudo manner. According to the above configuration, since it is not necessary to change the detection result indicating whether or not there is an abnormality in the main circuit by the abnormality detection circuit to be pseudo-abnormal when determining whether or not there is an abnormality in the communication interface, the abnormality of the communication interface can be determined without changing information such as a threshold used by the abnormality detection circuit when detecting whether or not there is an abnormality in main circuit.

In an aspect (4), the main circuit may be a power supply circuit that generates a control voltage to be supplied to another circuit based on a power supply voltage. The abnormality detection circuit may be a voltage abnormality detection circuit that detects whether or not there is an abnormality in the power supply circuit based on whether or not the control voltage is within a set predetermined voltage range. In the case where the pseudo abnormal signal is accepted from the control device, the pseudo abnormality generating unit may cause the voltage abnormality detection circuit to generate the detection result indicating that the power supply circuit is abnormal by changing upper and lower limit values that define the predetermined voltage range.

According to the aspect (4), in the case where the pseudo abnormality generating unit acquires the pseudo abnormal signal from the control device, the detection result indicating there is an abnormality in the power supply circuit can be generated in the pseudo manner by changing the upper and lower limit values that define the predetermined voltage range of the voltage abnormality detection circuit. In this case, the pseudo abnormality generating unit can easily cause the detection result to be pseudo-abnormal by simply changing the upper and lower limit values of the voltage abnormality detection circuit.

In an aspect (5), the main circuit may be a power supply circuit that generates a control voltage to be supplied to another circuit based on a power supply voltage. The abnormality detection circuit may be a voltage abnormality detection circuit that detects whether or not there is an abnormality in the power supply circuit based on whether or not the control voltage is within a predetermined voltage range. The detection result communication unit may include an abnormality detection result generating unit which outputs the detection result indicating abnormality of the main circuit to the communication interface regardless of a detection result of the voltage abnormality detection circuit in the case where the detection result communication unit accepts the pseudo abnormal signal from the control device.

According to the aspect (5), in the case where the pseudo abnormality generating unit acquires the pseudo abnormal signal from the control device, the communication interface outputs the detection result indicating there is an abnormality in the main circuit with respect to the control device. In this case, since the communication interface can make the detection result pseudo-abnormal without considering the detection result of the voltage abnormality detection circuit, a configuration of the communication interface can be simplified.

In an aspect (6), a motor control device may include the control circuit according to any one of the aspects (1) to (5), and a control device. The control device may output the pseudo abnormal signal to the pseudo abnormality generating unit, and determine whether or not there is an abnormality in the detection result communication unit based on the detection result accepted due to output of the pseudo abnormal signal to the pseudo abnormality generating unit.

According to the aspect (6), the control device can correctly acquire information on whether or not there is an abnormality in the main circuit, and can execute the calculation based on the correct information, so that the reliability of the motor control device can be improved.

According to one or more embodiments, the motor control device can correctly acquire information on whether or not there is an abnormality in the control circuit, and can execute calculation based on the correct information, so that the reliability of the control circuit and the motor control device can be improved.

DETAILED DESCRIPTION

First Embodiment

Hereinafter, a motor control device mounted on an electric power steering device (hereinafter referred to as "EPS") according to a first embodiment will be described.

Figure 1:
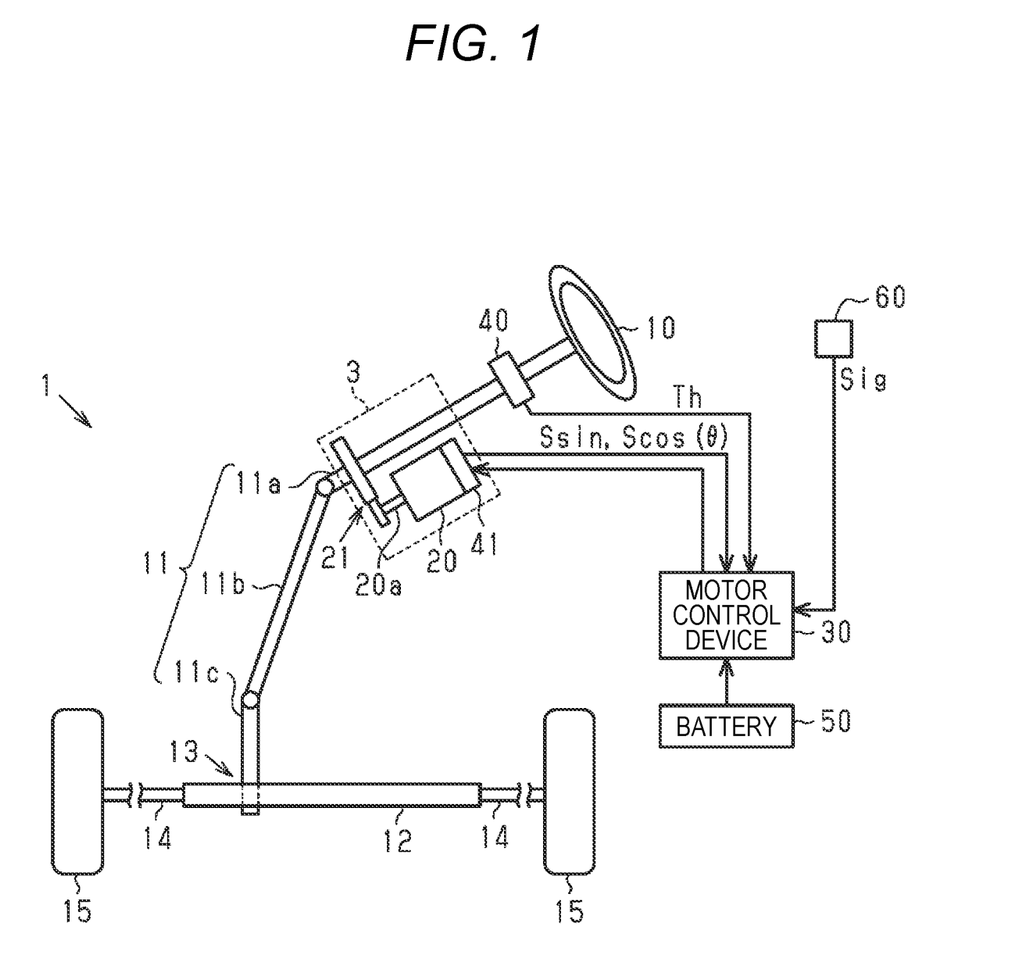
FIG. 1 is a schematic configuration diagram showing a schematic configuration of a steering device.

As shown in FIG. 1, the EPS includes a steering mechanism 1 that turns turning wheels 15 based on an operation of a steering wheel 10 by a driver, an actuator 3 including a motor 20 that generates an assisting force for assisting a steering operation on the steering mechanism 1, and a motor control device 30 that detects a rotation angle θ of the motor 20 and controls the motor 20.

The steering mechanism 1 includes a steering shaft 11 to which the steering wheel 10 is connected, and a rack shaft 12 that reciprocates in an axial direction in accordance with a rotation of the steering shaft 11. The steering shaft 11 includes a column shaft 11a connected to the steering wheel 10, an intermediate shaft 11b connected to a lower end portion of the column shaft 11a, and a pinion shaft 11c connected to a lower end portion of the intermediate shaft 11b. The rack shaft 12 and the pinion shaft 11c are arranged at a predetermined crossing angle, and rack teeth formed on the rack shaft 12 and pinion teeth formed on the pinion shaft 11c mesh with each other to form a rack and pinion mechanism 13. In addition, tie rods 14 are connected to both ends of the rack shaft 12, and a tip end of each of the tie rods 14 is connected to a knuckle (not shown) to which the turning wheel 15 is assembled. Therefore, in the EPS, a rotational motion of the steering shaft 11 accompanying the steering operation is converted into a reciprocating linear motion in an axial direction of the rack shaft 12 via the rack and pinion mechanism 13. By transmitting the reciprocating linear motion in the axial direction to the knuckle via the tie rod 14, a turning angle of the turning wheel 15, that is, a traveling direction of a vehicle is changed.

The actuator 3 includes the motor 20 and a speed reduction mechanism 21. A rotation shaft 20a of the motor 20 is connected to the column shaft 11a via the speed reduction mechanism 21. The rotation shaft 20a of the motor 20 can make multi-rotation. The speed reduction mechanism 21 reduces a speed of the rotation of the motor 20, and transmits a reduced rotational force to the column shaft 11a. That is, the steering operation of the driver is assisted by applying a torque of the motor 20 to the steering shaft 11 as the assisting force (assist force).

The motor control device 30 controls the motor 20 based on detection results of various sensors provided in the vehicle. For example, a torque sensor 40 and a rotation angle sensor 41 are provided as various sensors. The torque sensor 40 is provided on the column shaft 11a. The torque sensor 40 detects a steering torque Th applied to the steering shaft 11 in accordance with the steering operation of the driver. The rotation angle sensor 41 is provided on the motor 20. The rotation angle sensor 41 generates a detection signal for calculating an actual rotation angle $\theta$ of the rotation shaft 20a of the motor 20 and outputs the detection signal as a voltage value. A battery 50, which is a power source of electric power supplied to the motor 20, is connected to the motor control device 30. The motor control device 30 calculates the actual rotation angle $\theta$ of the motor 20 based on the detection signal generated by the rotation angle sensor 41. The rotation angle sensor 41 uses a magnetic sensor that generates a detection signal by detecting magnetism that changes in accordance with the rotation of the rotation shaft 20a of the motor 20. For example, a magnetoresistive effect sensor (MR sensor) is used as the magnetic sensor. The rotation angle sensor 41 includes a bridge circuit including two magnetic sensor elements, and generates electric signals (voltage) by these magnetic sensor elements, respectively. A phase of the electric signal generated by one of the magnetic sensor elements is shifted by 90 degrees from a phase of the electric signal generated by the other magnetic sensor element. Therefore, in the first embodiment, the electric signal generated by the one magnetic sensor element is regarded as a sine wave signal Ssin, and the electric signal generated by the other magnetic sensor element is regarded as a cosine wave signal Scos. The sine wave signal Ssin and the cosine wave signal Scos are the detection signals of the rotation angle sensor 41. The motor control device 30 calculates the multi-turn (multi-rotation) rotation angle $\theta$ of the motor 20 based on the detection signal (the sine wave signal Ssin and the cosine wave signal Scos) detected by the rotation angle sensor 41. The rotation angle $\theta$ of the rotation shaft 20a of the motor 20 is a value related to the steering angle of the steering shaft 11, which is a rotation shaft that is convertible into the turning angle of the turning wheel 15. In addition, a start switch 60 for starting a drive source of the vehicle is connected to the motor control device 30. A start signal Sig indicating a turning-on/off state of the start switch 60 is input to the motor control device 30. For example, an ignition switch is used as the start switch 60.

The motor control device 30 controls an operation of the motor 20 by supplying drive power to the motor 20, based on various state quantities detected by these sensors. That is, the motor control device 30 executes an assist control for applying the assist force to the steering mechanism 1 through the control of the motor 20.

A configuration of the motor control device 30 will be described.

Figure 2:
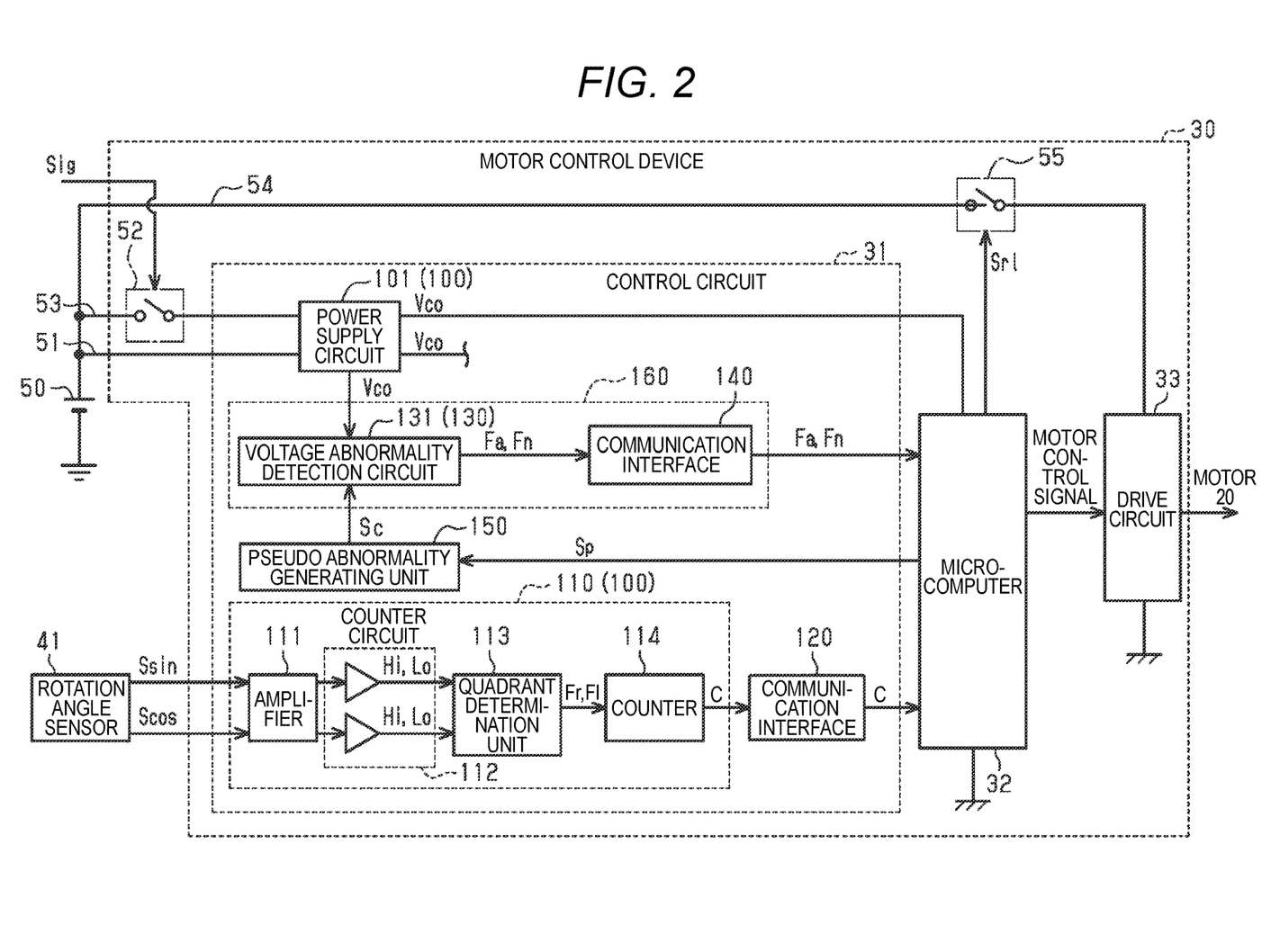
FIG. 2 is a block diagram showing an electrical configuration of a motor control device in a first embodiment.

As shown in FIG. 2, the motor control device 30 includes a control circuit 31, a microcomputer 32 as a control device that outputs a motor control signal, and a drive circuit 33 that supplies the drive power to the motor 20 based on the motor control signal.

The control circuit 31 is configured by packaging a logic circuit in which an electronic circuit, a flip-flop, or the like is combined into a single chip. The control circuit 31 is a so-called application specific integrated circuit (ASIC). The control circuit 31 performs a predetermined output with respect to a specific input (here, the detection signal of the rotation angle sensor 41). The control circuit 31 is always connected to the battery 50 mounted on the vehicle via a first connection line 51, and is connected to the battery 50 via a second connection line 53 provided with a power supply relay 52 in the middle thereof. A mechanical relay, a field effect transistor (FET), or the like is used as the power supply relay 52. The power supply relay 52 is turned on/off in accordance with the start signal Sig output from the start switch 60. That is, in a case where the start signal Sig indicating that the start switch 60 is in the turning-on state is input to the power supply relay 52, the electric power is supplied between the battery 50 and the control circuit 31 through the power supply relay 52. In a case where the start signal Sig indicating that the start switch 60 is in the turning-off state is input to the power supply relay 52, the electric power is cut off between the battery 50 and the control circuit 31 through the power supply relay 52. In addition, the detection signal (the sine wave signal Ssin and the cosine wave signal Scos) detected by the rotation angle sensor 41 is input to the control circuit 31. Based on the sine wave signal Ssin and the cosine wave signal Scos, the control circuit 31 outputs a count value C as rotation number information indicating the multi-turn number (the multi-rotation number) of the motor 20, which will be described later, to the microcomputer 32.

The drive circuit 33 is connected to the battery 50 via a power supply line 54 provided with a drive relay 55 in the middle thereof. A mechanical relay, a field effect transistor (FET), or the like is used as the drive relay 55.

The microcomputer 32 is connected to the battery 50 via the control circuit 31. In the case where the start signal Sig indicating that the start switch 60 is in the turning-on state is input to the power supply relay 52, the microcomputer 32 operates by being supplied with a control voltage Vco within a predetermined voltage range from the control circuit 31. When the microcomputer 32 starts the operation by being supplied with the control voltage Vco from the control circuit 31, the microcomputer 32 outputs a relay signal Srl to the drive relay 55. The drive relay 55 is turned on/off in response to the relay signal Srl output from the microcomputer 32. When the drive relay 55 is in a turning-on state based on the relay signal Srl, the drive power can be supplied to the motor 20.

Every time the start switch 60 is turned on, the microcomputer 32 acquires the count value C calculated by the control circuit 31. The microcomputer 32 updates the count value C acquired in a case where the start switch 60 is turned on in a predetermined calculation cycle by the microcomputer 32 itself, based on a change in the detection signal generated by the rotation angle sensor 41 during a period from when the start switch 60 is turned on to when the start switch 60 is turned off. In addition, the microcomputer 32 acquires the detection signal generated by the rotation angle sensor 41 in the predetermined calculation cycle. The microcomputer 32 calculates the multi-turn rotation angle θ of the motor 20 based on the acquired count value C and the detection signal. Specifically, the microcomputer 32 calculates arctangent from the two detection signals generated by the rotation angle sensor 41 to calculate the rotation angle of the motor 20 as a relative angle. The relative angle represents the rotation angle of the motor 20 within a range of 0 to 360 degrees. In addition, the microcomputer 32 calculates the multi-turn rotation angle θ of the motor 20 based on the count value C calculated by the control circuit 31 and the calculated relative angle. Based on the count value C, the microcomputer 32 grasps how many times the rotation shaft 20a of the motor 20 is rotated in units of one round (360 degrees). The microcomputer 32 calculates the multi-turn rotation angle θ of the motor 20 by adding a value obtained by multiplying the multi-turn numbers of the rotation shaft 20a of the motor 20 based on the count value C by 360 degrees to the relative angle. The microcomputer 32 can also calculate a steering angle of the steering wheel 10 (the turning angle of the pinion shaft 11c) from the multi-turn rotation angle θ of the motor 20 by the absolute angle in consideration of a reduction ratio of the speed reduction mechanism 21 interposed between the motor 20 and the steering shaft 11. The motor control device 30 controls the drive power to be supplied to the motor 20 by generating the motor control signal based on the multi-turn rotation angle θ of the motor 20 thus acquired and the steering torque Th detected by the torque sensor 40.

A configuration of the control circuit 31 will be described. The control circuit 31 includes a main circuit 100 that calculates the count value C as the rotation number indicating a rotational state of the motor 20 based on the detection signal detected by the rotation angle sensor 41. The main circuit 100 includes a power supply circuit 101 that steps down a power supply voltage of the battery 50 to the control voltage Vco within the predetermined voltage range. The first connection line 51 and the second connection line 53 are connected to an input side of the power supply circuit 101. An output side of the power supply circuit 101 is connected to the microcomputer 32 via a microcomputer connection line, and is connected to circuits forming the control circuit 31. In FIG. 2, for convenience of explanation, a connection line for connecting the power supply circuit 101 and each circuit forming the control circuit 31 is omitted. The power supply circuit 101 supplies the control voltage Vco to the microcomputer 32 only when the start switch 60 is turned on, and always supplies the control voltage Vco to each circuit forming the control circuit 31 regardless of the turning-on/off state of the start switch 60. As a result, each circuit forming the control circuit 31 operates not only when the start switch 60 is turned on but also when the start switch 60 is turned off.

The main circuit 100 includes a counter circuit 110. In addition, the control circuit 31 includes a communication interface 120.

The counter circuit 110 acquires the detection signal (the sine wave signal Ssin and the cosine wave signal Scos) generated by the rotation angle sensor 41 as the voltage value. The counter circuit 110 calculates the count value C used for calculating the multi-turn rotation angle θ of the motor 20 based on the detection signal. The count value C is the rotation number information indicating the multi-turn number (the multi-rotation number) of the motor 20. In the first embodiment, the count value C is information indicating how many times a rotational position of the rotation shaft 20a of the motor 20 is rotated with respect to a reference position that is a position when the start switch 60 is turned off.

The counter circuit 110 includes an amplifier 111, a comparator 112, a quadrant determination unit 113, and a counter 114.

The amplifier 111 acquires the detection signal (the sine wave signal Ssin and the cosine wave signal Scos) generated by the rotation angle sensor 41 as a voltage value. The amplifier 111 amplifies the voltage value acquired from the rotation angle sensor 41 and outputs the amplified voltage value to the comparator 112.

The comparator 112 generates a Hi level signal if the voltage value (the voltage value amplified by the amplifier 111) generated by the rotation angle sensor 41 is higher than a set threshold value, and generates a Lo level signal if the voltage value is lower than the set threshold value. The threshold value is set to "0", for example. That is, the comparator 112 generates the Hi level signal in a case where the voltage value (the voltage value amplified by the amplifier 111) is positive, whereas the comparator 112 generates the Lo level signal in a case where the voltage value is negative.

Based on the Hi level signal and the Lo level signal generated by the comparator 112, the quadrant determination unit 113 generates quadrant information that is information indicating a quadrant in which the rotational position of the rotation shaft 20a of the motor 20 exists. One rotation (360 degrees) of the rotation shaft 20a of the motor 20 is divided into four quadrants every 90 degrees from a combination of the Hi level signal and the Lo level signal, that is, a positive/negative combination of the detection signal. The quadrant determination unit 113 generates a left rotation flag Fl or a right rotation flag Fr based on a change in the quadrant indicated by the quadrant information, in which the rotational position of the rotation shaft 20a of the motor 20 exists. In the quadrant determination unit 113, the rotation by a unit rotation amount (90 degrees) is assumed to be performed every time the quadrant in which the rotational position of the rotation shaft 20a of the motor 20 exists changes to an adjacent quadrant. The quadrant determination unit 113 specifies a rotation direction of the rotation shaft 20a of the motor 20 based on a relationship between the quadrant in which the rotational position of the rotation shaft 20a of the motor 20 exists before the rotation of the motor 20 and the quadrant in which the rotational position of the rotation shaft 20a of the motor 20 exists after the rotation of the motor 20.

The counter 114 calculates the count value C based on the left rotation flag Fl or the right rotation flag Fr acquired from the quadrant determination unit 113. The counter 114 is a logic circuit in which flip-flops or the like are combined. The count value C indicates the number of times the rotational position of the rotation shaft 20a of the motor 20 is rotated by the unit rotation amount (90 degrees) with respect to the reference position. The counter 114 increments (adds one to the count value C) every time the left rotation flag Fl is acquired from the quadrant determination unit 113, and decrements (the count value C is subtracted by one) every time the right rotation flag Fr is acquired from the quadrant determination unit 113. In this way, the counter 114 calculates the count value C every time the detection signal is generated from the rotation angle sensor 41, and stores the count value C thereof. The count value C calculated by the counter 114 is output to the communication interface 120.

Every time the start switch 60 is turned on, the communication interface 120 outputs the count value C stored in the counter 114 to the microcomputer 32. On the other hand, the communication interface 120 does not operate in the case where the start switch 60 is turned off.

The control circuit 31 includes an abnormality detection circuit 130 that detects whether or not there is an abnormality in the main circuit 100, and a communication interface 140 that output a detection result of the abnormality detection circuit 130 to the microcomputer 32. In the present embodiment, the control circuit 31 includes, as the abnormality detection circuit 130, a voltage abnormality detection circuit 131 that detects whether or not there is an abnormality in the power supply circuit 101.

The voltage abnormality detection circuit 131 detects whether or not there is an abnormality in the power supply circuit 101 based on whether or not the control voltage Vco output from the power supply circuit 101 is within the predetermined voltage range. Specifically, the voltage abnormality detection circuit 131 detects the control voltage Vco output from the power supply circuit 101, and detects whether or not there is an abnormality in the power supply circuit 101 based on whether or not the control voltage Vco is greater than an upper limit value Vhi of the predetermined voltage range or less than a lower limit value Vlo of the predetermined voltage range. In a case where the control voltage Vco is greater than the upper limit value Vhi of the predetermined voltage range or less than the lower limit value Vlo of the predetermined voltage range, the voltage abnormality detection circuit 131 generates a voltage abnormality flag Fa that is a detection result indicating there is an abnormality in the power supply circuit 101. On the other hand, in a case where the control voltage Vco is equal to or less than the upper limit value Vhi of the predetermined voltage range and equal to or greater than the lower limit value Vlo of the predetermined voltage range, the voltage abnormality detection circuit 131 generates a voltage normal flag Fn that is a detection result indicating there is no abnormality in the power supply circuit 101. The voltage abnormality detection circuit 131 outputs, for example, "1" as the voltage abnormality flag Fa, and outputs, for example, "0" as the voltage normal flag Fn. The voltage abnormality flag Fa and the voltage normal flag Fn generated by the voltage abnormality detection circuit 131 are output to the communication interface 140.

The communication interface 140 outputs the voltage abnormality flag Fa and the voltage normal flag Fn acquired from the voltage abnormality detection circuit 131 to the microcomputer 32. In a case where the voltage abnormality flag Fa is acquired, the microcomputer 32 notifies a fact that there is an abnormality through a warning lamp or the like (not shown) and stops the calculation of the multi-turn rotation angle θ of the motor 20. Incidentally, a detection result communication unit 160 that generates a detection result indicating whether or not there is an abnormality in the power supply circuit 101 is configured by the voltage abnormality detection circuit 131 and the communication interface 140.

In a case where there is an abnormality in the communication interface 140, even if there is an abnormality in the power supply circuit 101, the microcomputer 32 cannot recognize the abnormality. Specifically, in the case where there is an abnormality in the communication interface 140, the communication interface 140 cannot output the detection result generated by the voltage abnormality detection circuit 131 with respect to the microcomputer 32 as it is, and may output only the voltage normal flag Fn. In this way, there is an abnormality in which the detection result output from the communication interface 140 to the microcomputer 32 is stuck to "0" as the voltage normal flag Fn, and in this case, a reliability of the motor control device 30 is reduced. That is, in a case where the voltage abnormality detection circuit 131 generates the voltage abnormality flag Fa that is the detection result indicating there is an abnormality in the power supply circuit 101, when there is an abnormality in the communication interface 140, the communication interface 140 may output the voltage normal flag Fn, which is the detection result indicating there is no abnormality in the power supply circuit 101, with respect to the microcomputer 32. In this case, the microcomputer 32 recognizes that there is no abnormality in the power supply circuit 101 even though there is an abnormality in the power supply circuit 101, based on the voltage normal flag Fn acquired from the communication interface 140. As a result, the motor control device 30 may execute calculation based on erroneous information. Therefore, in the present embodiment, the microcomputer 32 outputs a pseudo abnormal signal Sp to the control circuit 31, and the abnormality of the communication interface 140 can be detected based on the detection result acquired due to the microcomputer 32 outputting the pseudo abnormal signal Sp to the control circuit 31.

The control circuit 31 includes a pseudo abnormality generating unit 150 that sets the detection result generated by the voltage abnormality detection circuit 131 to be pseudo-abnormal based on the pseudo abnormal signal Sp from the microcomputer 32. During an initial check performed when the start switch 60 is turned on, the microcomputer 32 outputs the pseudo abnormal signal Sp to the pseudo abnormality generating unit 150. The pseudo abnormality generating unit 150 is a so-called built-in self-test (BIST) circuit that diagnoses the power supply circuit 101. In a case where the pseudo abnormal signal Sp is acquired, the pseudo abnormality generating unit 150 causes the voltage abnormality detection circuit 131 to generate the voltage abnormality flag Fa that is the detection result indicating there is an abnormality in the power supply circuit 101. The pseudo abnormal signal Sp is a signal that instructs an operation of the BIST circuit, and is a signal that always sets the detection result generated by the voltage abnormality detection circuit 131 to be pseudo-abnormal (voltage abnormality flag Fa). Specifically, in the case where the pseudo abnormal signal Sp is acquired, the pseudo abnormality generating unit 150 outputs a change command Sc for changing the upper limit value Vhi and the lower limit value Vlo of the predetermined voltage range of the control voltage Vco with respect to the voltage abnormality detection circuit 131. The change command Sc is a command to change the upper limit value Vhi and the lower limit value Vlo set by the voltage abnormality detection circuit 131 to a value out of the original predetermined voltage range, so that the control voltage Vco becomes a value out of the predetermined voltage range. Therefore, in a case where the voltage abnormality detection circuit 131 is normal, the voltage abnormality detection circuit 131 generates the voltage abnormality flag Fa. Further, the voltage abnormality flag Fa generated by the voltage abnormality detection circuit 131 is output to the communication interface 140. The communication interface 140 outputs the voltage abnormality flag Fa acquired from the voltage abnormality detection circuit 131 to the microcomputer 32.

The microcomputer 32 detects the abnormality of the communication interface 140 based on the detection result acquired due to the output of the pseudo abnormal signal Sp to the pseudo abnormality generating unit 150. That is, in a case where the microcomputer 32 acquires the voltage abnormality flag Fa due to the output of the pseudo abnormal signal Sp to the pseudo abnormality generating unit 150, the microcomputer 32 determines that there is no abnormality in the communication interface 140. In addition, in a case where the microcomputer 32 acquires the voltage normal flag Fn due to the output of the pseudo abnormal signal Sp to the pseudo abnormality generating unit 150, the microcomputer 32 determines that there is an abnormality in the communication interface 140. The voltage abnormality detection circuit 131 changes the upper limit value Vhi and the lower limit value Vlo based on the acquisition of the change command Sc from the pseudo abnormality generating unit 150, and then returns the changed upper limit value Vhi and lower limit value Vlo to an original value when a predetermined time has elapsed. In addition, the pseudo abnormality generating unit 150 stops an operation after a lapse of a predetermined time after acquiring the pseudo abnormal signal Sp.

In addition to the occurrence of the abnormality in the communication interface 140, an abnormality may occur in the voltage abnormality detection circuit 131. Therefore, for example, the pseudo abnormality generating unit 150 diagnoses the abnormality of the voltage abnormality detection circuit 131 at a predetermined cycle as the BIST circuit. In the case where the upper limit value Vhi and the lower limit value Vlo are changed, the pseudo abnormality generating unit 150 executes diagnosis of the voltage abnormality detection circuit 131 based on whether or not the voltage abnormality detection circuit 131 generates the voltage abnormality flag Fa. In this way, the pseudo abnormality generating unit 150 diagnoses the abnormality of the voltage abnormality detection circuit 131.

A method of detecting an abnormality in the communication interface 140 will be described with reference to FIG. 3. Here, it is assumed that there is no abnormality in the power supply circuit 101 and the voltage abnormality detection circuit 131.

Figure 3:
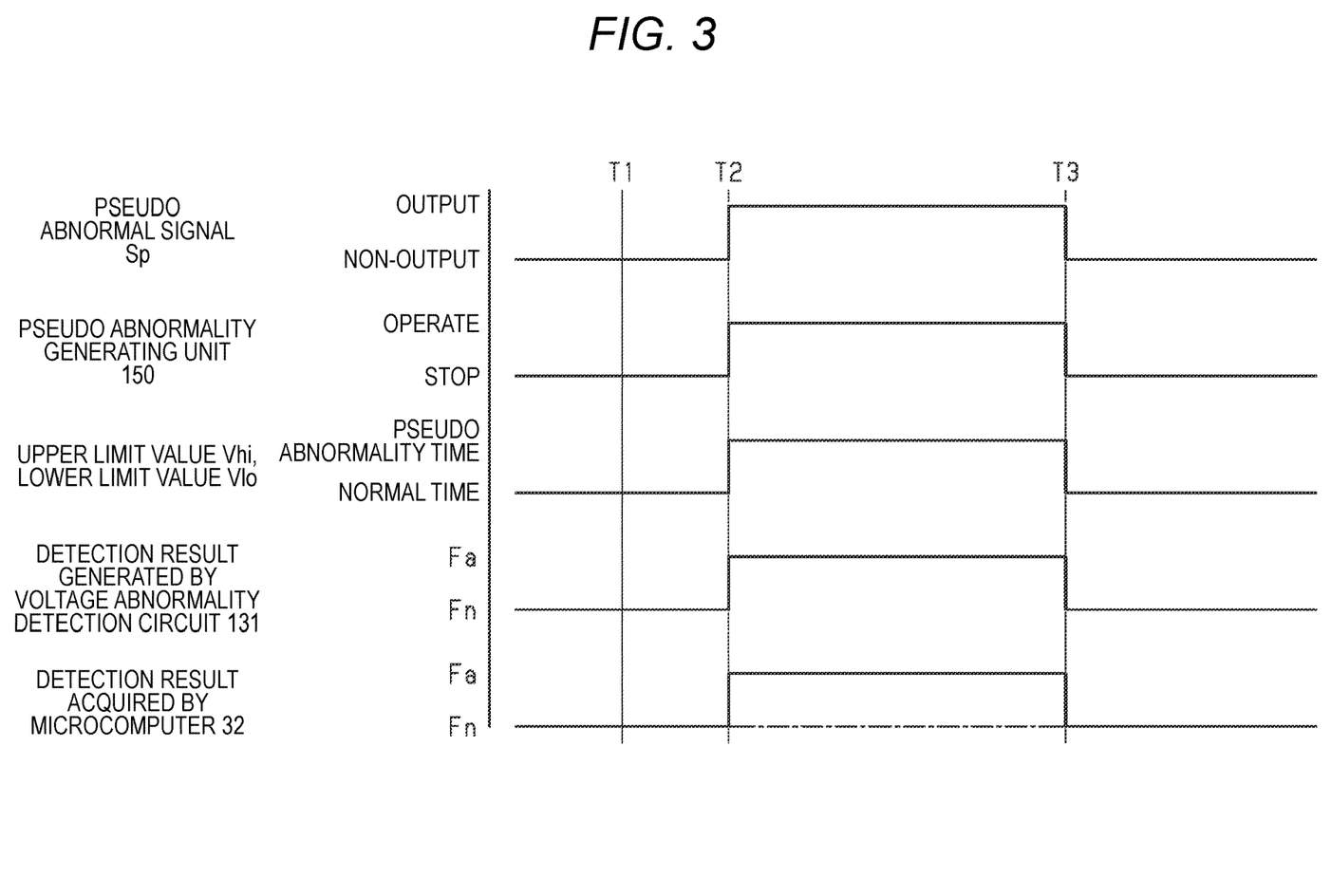
FIG. 3 is a diagram showing a method of detecting an abnormality in a communication interface in the first embodiment.

As shown in FIG. 3, time T1 is normal time when the microcomputer 32 does not output the pseudo abnormal signal Sp to the control circuit 31. In a case where the pseudo abnormal signal Sp is not acquired from the microcomputer 32, the pseudo abnormality generating unit 150 does not output the change command Sc to the voltage abnormality detection circuit 131, and stops the operation thereof. The voltage abnormality detection circuit 131 determines whether or not the control voltage Vco is within the predetermined voltage range defined by the upper limit value Vhi and the lower limit value Vlo. Since the power supply circuit 101 is normal, the control voltage Vco is within the predetermined voltage range. Therefore, the voltage abnormality detection circuit 131 generates the voltage normal flag Fn. The communication interface 140 outputs the voltage normal flag Fn generated by the voltage abnormality detection circuit 131 to the microcomputer 32. The microcomputer 32 grasps that there is no abnormality in the power supply circuit 101, based on the voltage normal flag Fn that is the detection result acquired from the communication interface 140.

Time T2 is time of generating a pseudo abnormality when the microcomputer 32 outputs the pseudo abnormal signal Sp to the control circuit 31. In the case where the pseudo abnormal signal Sp is acquired from the microcomputer 32, the pseudo abnormality generating unit 150 starts the operation and outputs the change command Sc to the voltage abnormality detection circuit 131. The voltage abnormality detection circuit 131 determines whether or not the control voltage Vco is within the predetermined voltage range at the time of generating the pseudo abnormality defined by the upper limit value and the lower limit value changed by the change command Sc. Since the power supply circuit 101 is normal, the control voltage Vco is out of the predetermined voltage range at the time of generating the pseudo abnormality. The voltage abnormality detection circuit 131 generates the voltage abnormality flag Fa. The communication interface 140 outputs the voltage abnormality flag Fa generated by the voltage abnormality detection circuit 131 to the microcomputer 32. As indicated by a solid line, in a case where the communication interface 140 is normal, the microcomputer 32 acquires the voltage abnormality flag Fa. On the other hand, as indicated by a one-dot chain line, in the case where the communication interface 140 is abnormal, the microcomputer 32 acquires the voltage normal flag Fn. In the case where the communication interface 140 is normal, the microcomputer 32 continues to acquire the voltage abnormality flag Fa from the time T2 to time T3.

The time T3 is time when the predetermined time has elapsed after the microcomputer 32 outputs the pseudo abnormal signal Sp to the control circuit 31, and is time when a pseudo abnormality generating state is switched to a normal state. The pseudo abnormality generating unit 150 stops the operation after the lapse of the predetermined time after acquiring the pseudo abnormal signal Sp. In addition, the voltage abnormality detection circuit 131 also returns the upper limit value Vhi and the lower limit value Vlo that define the predetermined voltage range to the original value after the lapse of the predetermined time after acquiring the change command Sc. Accordingly, the voltage abnormality detection circuit 131 generates the voltage normal flag Fn assuming that the control voltage Vco is within the predetermined voltage range. In a case where the voltage normal flag Fn is acquired from the voltage abnormality detection circuit 131, the communication interface 140 erases the currently stored detection result indicating whether or not there is an abnormality in the voltage abnormality detection circuit 131, and outputs the acquired voltage normal flag Fn to the microcomputer 32. The microcomputer 32 erases the currently stored detection result of the voltage abnormality detection circuit 131, and stores the voltage normal flag Fn that is a detection result of the voltage abnormality detection circuit 131 acquired from the communication interface 140.

The microcomputer 32 confirms that the voltage normal flag Fn can be acquired from the control circuit 31 at the time T1, confirms that the voltage abnormality flag Fa can be acquired from the control circuit 31 due to the output of the pseudo abnormal signal Sp at the time T2, and confirms that the voltage normal flag Fn can be acquired from the control circuit 31 due to the return to the normal state at the time T3. That is, the microcomputer 32 can detect the abnormality of the communication interface 140 by confirming whether or not the detection result has changed from the voltage normal flag Fn to the voltage abnormality flag Fa due to the output of the pseudo abnormal signal Sp at the time T2. Therefore, the microcomputer 32 can determine that there is no abnormality in the communication interface 140, and that the detection result output from the communication interface 140 to the microcomputer 32 is not stuck to the voltage normal flag Fn.

The operation and effects of the first embodiment will be described.

(1) The microcomputer 32 can detect an abnormality of the detection result communication unit based on the pseudo abnormal signal Sp output to the pseudo abnormality generating unit 150 and the detection result acquired due to the output of the pseudo abnormal signal Sp to the pseudo abnormality generating unit 150. If there is an abnormality in the communication interface 140, the microcomputer 32 acquires the detection result indicating there is no abnormality in the power supply circuit 101, in spite of the output of the pseudo abnormal signal Sp to the pseudo abnormality generating unit 150. As a result, the control circuit 31 can correctly output information on whether or not there is an abnormality in the power supply circuit 101 to the microcomputer 32, and the microcomputer 32 can execute the calculation based on the correct information, so that the reliability of the control circuit 31 can be improved.

(2) The microcomputer 32 can detect the abnormality of the communication interface 140 based on whether or not the microcomputer 32 can acquire the detection result indicating there is an abnormality in the power supply circuit 101 generated in the voltage abnormality detection circuit 131 due to the output of the pseudo abnormal signal Sp to the pseudo abnormality generating unit 150. In addition, in the case where the microcomputer 32 acquires the detection result indicating there is an abnormality in the power supply circuit 101 due to the output of the pseudo abnormal signal Sp to the pseudo abnormality generating unit 150, the microcomputer 32 can grasp that there is no abnormality not only in the communication interface 140 but also in the voltage abnormality detection circuit 131.

(3) In the case where the pseudo abnormality generating unit 150 acquires the pseudo abnormal signal Sp from the microcomputer 32, the detection result indicating there is an abnormality in the power supply circuit 101 can be generated in a pseudo manner by changing the upper limit value Vhi and the lower limit value Vlo that define the predetermined voltage range of the voltage abnormality detection circuit 131. In this case, the pseudo abnormality generating unit 150 can easily cause the detection result to be pseudo-abnormal by simply changing the upper limit value Vhi and the lower limit value Vlo of the voltage abnormality detection circuit 131.

(4) The motor control device 30 can correctly acquire the information on whether there is an abnormality in the power supply circuit 101, and can execute the calculation based on the correct information, so that the reliability of the motor control device 30 can be improved.

Second Embodiment

Hereinafter, a motor control device mounted on the EPS according to a second embodiment will be described. Here, differences from the first embodiment will be mainly described.

Figure 4:
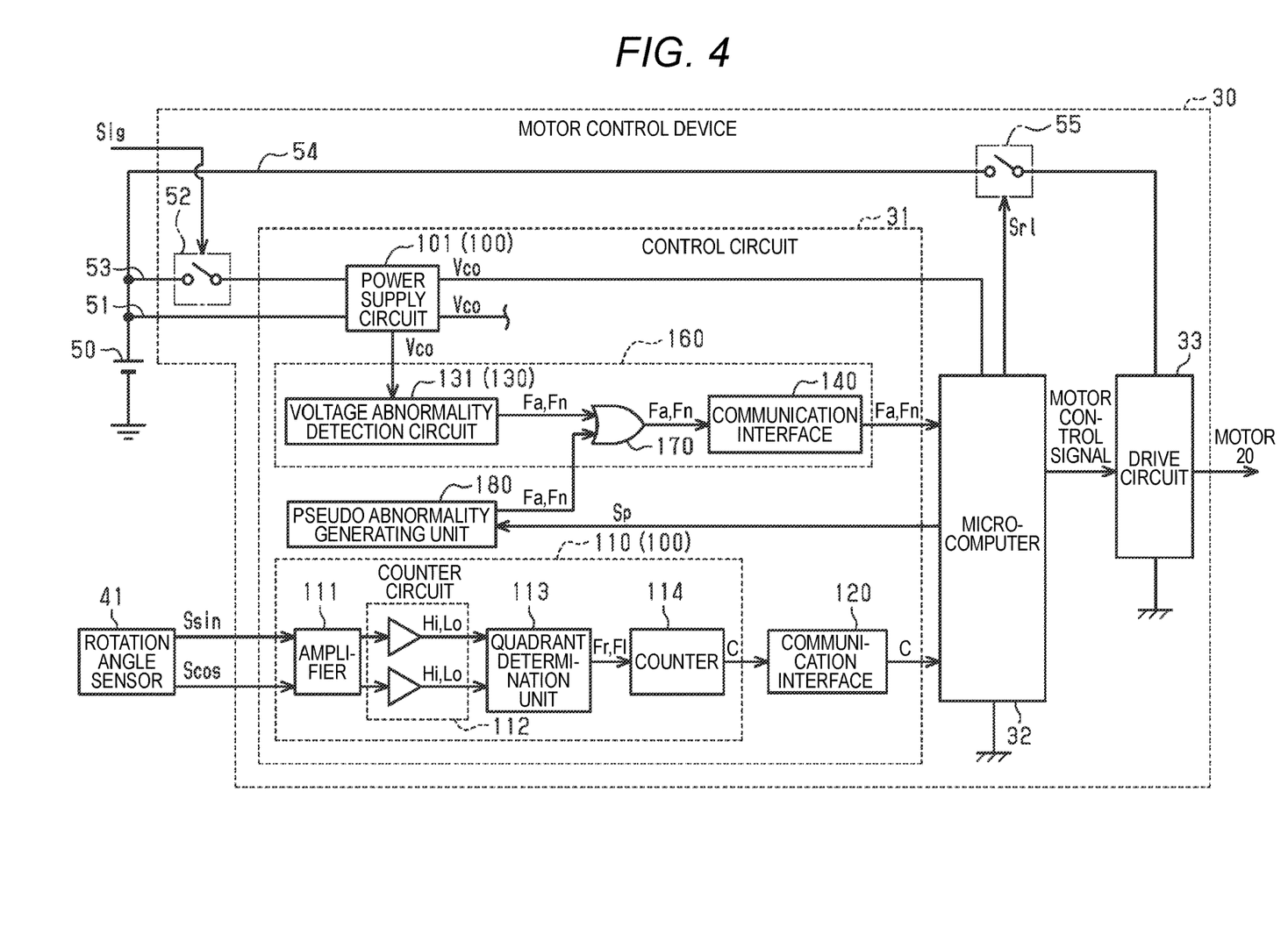
FIG. 4 is a block diagram showing an electrical configuration of a motor control device in a second embodiment.

As shown in FIG. 4, the control circuit 31 includes a pseudo abnormality generating unit 180 that sets the detection result output from the communication interface 140 to be pseudo-abnormal based on the pseudo abnormal signal Sp from the microcomputer 32. In the case where the pseudo abnormal signal Sp is acquired, the pseudo abnormality generating unit 180 causes the communication interface 140 to output the voltage abnormality flag Fa that is the detection result indicating there is an abnormality in the power supply circuit 101. The pseudo abnormal signal Sp is a signal that always sets the detection result output from the communication interface 140 to the microcomputer 32 to be pseudo-abnormal (voltage abnormality flag Fa). Specifically, an OR circuit 170 used as an abnormality detection result generating unit is provided between the voltage abnormality detection circuit 131 and the communication interface 140. The detection result communication unit 160 includes the OR circuit 170. The pseudo abnormality generating unit 180 outputs the voltage abnormality flag Fa or the voltage normal flag Fn to the OR circuit 170. The pseudo abnormality generating unit 180 outputs the voltage abnormality flag Fa in the case where the pseudo abnormal signal Sp is acquired, and the pseudo abnormality generating unit 180 outputs the voltage normal flag Fn in the case where the pseudo abnormal signal Sp is not acquired. The OR circuit 170 acquires the voltage abnormality flag Fa or the voltage normal flag Fn from the voltage abnormality detection circuit 131, and acquires the voltage abnormality flag Fa or the voltage normal flag Fn from the pseudo abnormality generating unit 180. In a case where the voltage normal flag Fn is acquired from both the voltage abnormality detection circuit 131 and the pseudo abnormality generating unit 180, the OR circuit 170 outputs the voltage normal flag Fn to the communication interface 140. In a case where the voltage abnormality flag Fa is acquired from at least one of the voltage abnormality detection circuit 131 and the pseudo abnormality generating unit 180, the OR circuit 170 outputs the voltage abnormality flag Fa to the communication interface 140. As described above, in a case where the voltage abnormality flag Fa is acquired from the pseudo abnormality generating unit 180, the communication interface 140 outputs the voltage abnormality flag Fa to the microcomputer 32 without changing the upper limit value Vhi and the lower limit value Vlo used by the voltage abnormality detection circuit 131 when detecting whether or not there is an abnormality in the power supply circuit 101. That is, in the case where the voltage abnormality flag Fa is acquired from the pseudo abnormality generating unit 180, even if the voltage normal flag Fn is acquired from the voltage abnormality detection circuit 131, the communication interface 140 outputs the voltage abnormality flag Fa to the microcomputer 32 without outputting the voltage normal flag Fn to the microcomputer 32. The pseudo abnormality generating unit 180 continues to output the voltage abnormality flag Fa to the OR circuit 170 until the predetermined time elapses after acquiring the pseudo abnormal signal Sp. After the predetermined time has elapsed after acquiring the pseudo abnormal signal Sp, the pseudo abnormality generating unit 180 ends the output of the voltage abnormality flag Fa, which is the detection result indicating there is an abnormality in the power supply circuit 101, with respect to the communication interface 140.

The microcomputer 32 detects the abnormality of the communication interface 140 based on the detection result acquired due to the output of the pseudo abnormal signal Sp to the pseudo abnormality generating unit 180. That is, in a case where the voltage abnormality flag Fa is acquired due to the output of the pseudo abnormal signal Sp to the pseudo abnormality generating unit 180, the microcomputer 32 determines that there is no abnormality in the communication interface 140. In addition, in the case where the voltage normal flag Fn is acquired due to the output of the pseudo abnormal signal Sp to the pseudo abnormality generating unit 180, the microcomputer 32 determines that there is an abnormality in the communication interface 140.

A method of detecting an abnormality in the communication interface 140 will be described with reference to FIG. 5. Here, it is assumed that there is no abnormality in the power supply circuit 101 and the voltage abnormality detection circuit 131.

Figure 5:
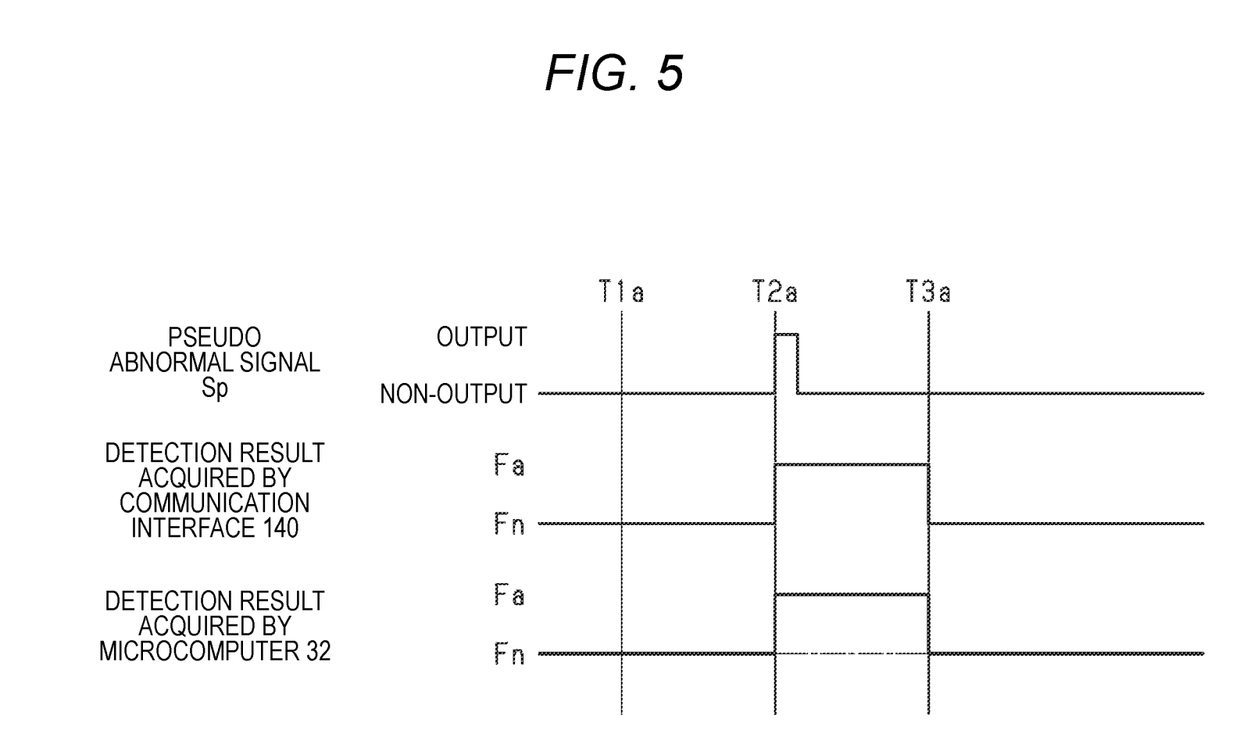
FIG. 5 is a diagram showing a method of detecting an abnormality in a communication interface in the second embodiment.

As shown in FIG. 5, time T1a is normal time when the microcomputer 32 does not output the pseudo abnormal signal Sp to the control circuit 31. In the case where the pseudo abnormal signal Sp is not acquired from the microcomputer 32, the pseudo abnormality generating unit 180 outputs the voltage normal flag Fn to the OR circuit 170. Since the power supply circuit 101 is normal, the control voltage Vco is within the predetermined voltage range. Therefore, the voltage abnormality detection circuit 131 generates the voltage normal flag Fn. The OR circuit 170 acquires the voltage normal flag Fn from the pseudo abnormality generating unit 180, and acquires the voltage normal flag Fn from the voltage abnormality detection circuit 131, and therefore the OR circuit 170 outputs the voltage normal flag Fn to the communication interface 140. Then, the communication interface 140 outputs the voltage normal flag Fn acquired from the OR circuit 170 to the microcomputer 32. The microcomputer 32 grasps that there is no abnormality in the power supply circuit 101, based on the voltage normal flag Fn that is the detection result acquired from the communication interface 140.

Time T2a is time of generating a pseudo abnormality when the microcomputer 32 outputs the pseudo abnormal signal Sp to the control circuit 31. In the case where the pseudo abnormal signal Sp is acquired from the microcomputer 32, the pseudo abnormality generating unit 180 outputs the voltage abnormality flag Fa to the OR circuit 170. Since the power supply circuit 101 is normal, the control voltage Vco is within the predetermined voltage range as in the case of the time T1a. Therefore, the voltage abnormality detection circuit 131 generates the voltage normal flag Fn. The OR circuit 170 acquires the voltage abnormality flag Fa from the pseudo abnormality generating unit 180, and acquires the voltage normal flag Fn from the voltage abnormality detection circuit 131, and therefore the OR circuit 170 outputs the voltage abnormality flag Fa to the communication interface 140. As indicated by a solid line, in the case where the communication interface 140 is normal, the microcomputer 32 acquires the voltage abnormality flag Fa. On the other hand, as indicated by a one-dot chain line, in the case where the communication interface 140 is abnormal, the microcomputer 32 acquires the voltage normal flag Fn. In the case where the communication interface 140 is normal, the microcomputer 32 continues to acquire the voltage abnormality flag Fa from the time T2 to time T3.

The time T3a is time when the predetermined time has elapsed after the microcomputer 32 outputs the pseudo abnormal signal Sp to the control circuit 31, and is time when a pseudo abnormality generating state is switched to a normal state. After a lapse of the predetermined time after acquiring the pseudo abnormal signal Sp from the microcomputer 32, the pseudo abnormality generating unit 180 stops outputting the voltage abnormality flag Fa to the OR circuit 170, and starts outputting the voltage normal flag Fn. In the case where the power supply circuit 101 is normal, the control voltage Vco is within the predetermined voltage range as in the case of the time T1a. Therefore, the voltage abnormality detection circuit 131 generates the voltage normal flag Fn. The OR circuit 170 acquires the voltage normal flag Fn from the pseudo abnormality generating unit 180, and acquires the voltage normal flag Fn from the voltage abnormality detection circuit 131, and therefore the OR circuit 170 outputs the voltage normal flag Fn to the communication interface 140. Then, the communication interface 140 outputs the voltage normal flag Fn acquired from the OR circuit 170 to the microcomputer 32 as it is.

The microcomputer 32 confirms that the voltage normal flag Fn can be acquired from the control circuit 31 at the time T1a, confirms that the voltage abnormality flag Fa can be acquired from the control circuit 31 due to the output of the pseudo abnormal signal Sp at the time T2a, and confirms that the voltage normal flag Fn can be acquired from the control circuit 31 due to the return to the normal state at the time T3a. Therefore, the microcomputer 32 can determine that there is no abnormality in the communication interface 140, and that the detection result output from the communication interface 140 to the microcomputer 32 is not stuck to the voltage normal flag Fn.

The operation and effects of the second embodiment will be described.

(5) The microcomputer 32 can detect the abnormality of the communication interface 140 based on whether or not the microcomputer 32 can acquire the detection result indicating there is an abnormality in the power supply circuit 101 output from the communication interface 140 due to the output of the pseudo abnormal signal Sp to the pseudo abnormality generating unit 180. In addition, there is a case where the voltage abnormality detection circuit 131 cannot create a detection result indicating there is an abnormality in the power supply circuit 101 in the pseudo manner. In this point, according to the present embodiment, it is not necessary to change the detection result indicating whether or not there is an abnormality in the power supply circuit 101 by the voltage abnormality detection circuit 131 to be pseudo-abnormal, when determining whether or not there is an abnormality in the communication interface 140. Therefore, the abnormality of the communication interface 140 can be determined without changing the upper limit value Vhi and the lower limit value Vlo used by the voltage abnormality detection circuit 131 when detecting whether or not there is an abnormality in the power supply circuit 101.

(6) In the case where the pseudo abnormality generating unit 180 acquires the pseudo abnormal signal Sp from the microcomputer 32, the communication interface 140 outputs the detection result indicating there is an abnormality in the power supply circuit 101 with respect to the microcomputer 32. In this case, since the communication interface 140 can make the detection result pseudo-abnormal without considering the detection result of the voltage abnormality detection circuit 131, a configuration of the communication interface 140 can be simplified.

Each of the embodiments may be modified as follows. In addition, the following other embodiments can be combined with each other as long as there is no technical contradiction.

In each embodiment, the microcomputer 32 outputs the pseudo abnormal signal Sp to the pseudo abnormality generating units 150, 180 during the initial check performed when the start switch 60 is turned on, but the present invention is not limited thereto. The microcomputer 32 may output the pseudo abnormal signal Sp at any timing as long as it outputs the pseudo abnormal signal Sp to the pseudo abnormality generating units 150, 180 during a period in which the start switch 60 is turned on.

In the first embodiment, in the case where the change command Sc is acquired, the voltage abnormality detection circuit 131 set the detection result generated by the voltage abnormality detection circuit 131 to be pseudo-abnormal by changing the upper limit value Vhi and the lower limit value Vlo of the predetermined voltage range of the control voltage Vco, but the present invention is not limited thereto. For example, the voltage abnormality detection circuit 131 may set the detection result generated by the voltage abnormality detection circuit 131 to be pseudo-abnormal by changing at least one of the upper limit value Vhi and the lower limit value Vlo of the predetermined voltage range of the control voltage Vco. In addition, the voltage abnormality detection circuit 131 may set the control voltage Vco out of the predetermined voltage range by reducing the predetermined voltage range set by the upper limit value Vhi and the lower limit value Vlo. In the case where the change command Sc is acquired, the voltage abnormality detection circuit 131 may set the detection result generated by the voltage abnormality detection circuit 131 to be pseudo-abnormal by multiplying a value of the control voltage Vco used in determining whether or not the control voltage Vco is within the predetermined voltage range by a coefficient.

In each embodiment, the abnormality detection circuit 130 is the voltage abnormality detection circuit 131 that detects whether or not there is an abnormality in the power supply circuit 101, but the present invention is not limited thereto. For example, the abnormality detection circuit 130 may be an abnormality detection circuit that detects whether or not there is an abnormality in the counter circuit 110, or may be an abnormality detection circuit that detects whether or not there is an abnormality in a relationship between the right rotation flag Fr and the left rotation flag Fl generated by the quadrant determination unit 113 and a change value of the count value C. In this case, the detection result communication unit is configured by the abnormality detection circuit that detects whether or not there is an abnormality in the counter circuit 110 and the communication interface 120.

In each embodiment, the microcomputer 32 determines that the detection result output from the communication interface 140 to the microcomputer 32 is not stuck to the voltage normal flag Fn, but the present invention is not limited thereto. In addition to the fact that the detection result output from the communication interface 140 to the microcomputer 32 is not stuck to the voltage normal flag Fn, the microcomputer 32 may determine that the detection result is not stuck to the voltage abnormality flag Fa. As an example, in a case where a state in which the detection result acquired from the communication interface 140 is the voltage abnormality flag Fa continues for a predetermined time, the microcomputer 32 executes fail-safe, and determines whether or not the detection result is stuck to the voltage abnormality flag Fa. In a case where the microcomputer 32 determines whether or not the detection result is stuck to the voltage abnormality flag Fa, the microcomputer 32 outputs a pseudo normal signal to the pseudo abnormality generating unit 150. In a case where the pseudo normal signal is acquired, the pseudo abnormality generating unit 150 outputs the change command Sc for changing the upper limit value Vhi and the lower limit value Vlo so that the control voltage Vco has any value within the predetermined voltage range, with respect to the voltage abnormality detection circuit 131. In the case where the power supply circuit 101 is normal, the voltage abnormality detection circuit 131 generates the voltage normal flag Fn. The communication interface 140 outputs the voltage normal flag Fn acquired from the voltage abnormality detection circuit 131 to the microcomputer 32. The microcomputer 32 detects the abnormality of the communication interface 140 based on the detection result acquired due to the output of the pseudo normal signal to the pseudo abnormality generating unit 150. That is, in the case where the microcomputer 32 acquires the voltage normal flag Fn due to the output of the pseudo normal signal to the pseudo abnormality generating unit 150, the microcomputer 32 determines that there is no abnormality in the communication interface 140. In addition, in the case where the microcomputer 32 acquires the voltage abnormality flag Fa due to the output of the pseudo normal signal to the pseudo abnormality generating unit 150, the microcomputer 32 determines that there is an abnormality in the communication interface 140.

In the case where the pseudo abnormal signal Sp is acquired from the microcomputer 32, the pseudo abnormality generating units 150, 180 may make the detection result output from the communication interface 140 to be pseudo-abnormal by causing the detection result output from the communication interface 140 to be inverted between the voltage normal flag Fn and the voltage abnormality flag Fa. As an example, in a case where the power supply circuit 101 and the voltage abnormality detection circuit 131 are normal and the voltage abnormality detection circuit 131 outputs the voltage normal flag Fn, the pseudo abnormality generating units 150, 180 may cause the communication interface 140 to acquire the voltage abnormality flag Fa. In addition, in a case where the power supply circuit 101 and the voltage abnormality detection circuit 131 are normal and the voltage abnormality detection circuit 131 outputs the voltage abnormality flag Fa, the pseudo abnormality generating units 150, 180 may cause the communication interface 140 to acquire the voltage normal flag Fn.

In each embodiment, the control circuit 31 is the ASIC that executes a predetermined calculation for a specific input, but the present invention is not limited thereto. For example, the control circuit 31 may be realized by a microcomputer including a micro processing unit or the like. In addition, the control circuit 31 may read a program stored in the storage unit and execute a calculation corresponding to the program. Even in these cases, the configuration of the control circuit 31 can be simpler than a configuration of the microcomputer 32 because the count value C having a smaller calculation load than a calculation load of the multi-turn rotation angle θ is calculated. In addition, the control circuit 31 may be realized by a low power consumption microcomputer specialized for a specific function such as calculation of the multi-turn rotation angle θ. Even in this case, the configuration of the control circuit 31 can be made simpler than that of the microcomputer 32 because it is specialized for a specific function.

The rotation angle sensor 41 may be, for example, a sensor using a Hall element or a sensor using a resolver.

The rotation angle sensor 41 may detect, for example, a rotation angle of the steering shaft 11. The rotation angle of the steering shaft 11 can be converted into the multi-turn rotation angle θ of the motor 20 in consideration of the reduction ratio of the speed reduction mechanism 21 interposed between the motor 20 and the steering shaft 11.

The rotation angle sensor 41 is provided in the motor 20, but the rotation angle sensor 41 may be provided on the steering shaft 11, which is a rotation shaft of the steering wheel 10.

The control circuit 31 intermittently calculates the count value C even when the start switch 60 is turned on, but the control circuit 31 may not calculate the count value C when the start switch 60 is turned on. In this case, when the start switch 60 is switched from the turning-on state to the turning-off state, for example, the microcomputer 32 stores the current rotation angle θ, and the control circuit 31 intermittently calculates and stores the count value C after starting the operation. Further, when the start switch 60 is switched from the turning-off state to the turning-on state, the microcomputer 32 reads the count value C calculated by the control circuit 31 during a period in which the start switch 60 is turned off and the rotation angle θ stored when the start switch 60 is turned off, and calculates the rotation angle θ of the motor 20.

The EPS of each embodiment may be embodied in an EPS in which the rotation shaft 20a of the motor 20 and an axis of the rack shaft 12 are parallel to each other, or may be applied to an EPS in which the rotation shaft 20a and the rack shaft 12 exist coaxially. In addition, the present invention is not limited to the EPS, but may be embodied in, for example, a steer-by-wire type steering device.

The vehicle on which the EPS of each embodiment is mounted may be a vehicle including a so-called internal combustion engine that uses an engine as a vehicle drive source, or may be a so-called electric vehicle that uses a motor as the vehicle drive source. Incidentally, the start switch 60 in the case of the electric vehicle is a switch for starting the motor as the vehicle drive source.

DESCRIPTION OF REFERENCE NUMERALS AND SIGNS 1 steering mechanism
3 actuator
10 steering wheel
11 steering shaft
12 rack shaft
15 turning wheel
20 motor
20a rotation shaft
21 speed reduction mechanism
30 motor control device
31 control circuit
32 microcomputer
33 drive circuit
40 torque sensor
41 rotation angle sensor
50 battery
51 first connection line
52 power supply relay
53 second connection line
54 power supply line
55 drive relay
60 start switch
100 main circuit
101 power supply circuit
110 counter circuit
111 amplifier
112 comparator
113 quadrant determination unit
114 counter
120 communication interface
130 abnormality detection circuit
131 voltage abnormality detection circuit
140 communication interface
150 pseudo abnormality generating unit
160 detection result communication unit
170 OR circuit
180 pseudo abnormality generating unit
θ rotation angle
C count value
Fa voltage abnormality flag
Fn voltage normal flag
Fl left rotation flag
Fr right rotation flag
Sc change command
Sig start signal
Srl relay signal
Scos cosine wave signal
Ssin sine wave signal
Th steering torque
Vco control voltage
Vhi upper limit value
Vlo lower limit value

What is claimed is:

1. A control circuit connected to a control device, the control device being configured to control a motor connected to a rotation shaft that is convertible into a turning angle of a turning wheel, the control circuit comprising:
   a main circuit configured to calculate a rotation number indicating a rotational state of the rotation shaft based on a detection signal from a rotation angle sensor configured to detect a rotation angle of the motor as a relative angle;
   a detection result communication unit configured to detect whether or not there is an abnormality in the main circuit and output a detection result to the control device; and
   a pseudo abnormality generating unit configured to instruct the detection result communication unit to set the detection result to be abnormal, regardless of whether the abnormality is actually present in the main circuit, in response to receiving a pseudo abnormal signal from the control device,
   wherein in a case where the pseudo abnormality generating unit accepts the pseudo abnormal signal from the control device, the pseudo abnormality generating unit sets the detection result output from the detection result communication unit to be abnormal and causes the detection result communication unit to output the detection result to the control device.

2. The control circuit according to claim 1,
   wherein the detection result communication unit includes an abnormality detection circuit configured to detect whether or not there is an abnormality in the main circuit and generate the detection result, and a communication interface configured to output the detection result generated by the abnormality detection circuit to the control device, and
   wherein in the case where the pseudo abnormality generating unit accepts the pseudo abnormal signal from the control device, the pseudo abnormality generating unit causes the abnormality detection circuit to generate the detection result indicating that the main circuit is abnormal.

3. The control circuit according to claim 2,
   wherein the main circuit comprises a power supply circuit that generates a control voltage to be supplied to another circuit based on a power supply voltage,
   wherein the abnormality detection circuit is a voltage abnormality detection circuit that detects whether or not there is an abnormality in the power supply circuit based on whether or not the control voltage is within a set predetermined voltage range, and
   wherein in the case where the pseudo abnormal signal is accepted from the control device, the pseudo abnormality generating unit causes the voltage abnormality detection circuit to generate the detection result indicating that the power supply circuit is abnormal by changing upper and lower limit values that define the predetermined voltage range.

4. The control circuit according to claim 1,
wherein the detection result communication unit includes an abnormality detection circuit configured to detect whether or not there is an abnormality in the main circuit, and a communication interface configured to output the detection result of the abnormality detection circuit to the control device, and
wherein in the case where the pseudo abnormality generating unit accepts the pseudo abnormal signal from the control device, the pseudo abnormality generating unit causes the communication interface to output the detection result indicating that the main circuit is abnormal.

5. The control circuit according to claim 4,
wherein the main circuit comprises a power supply circuit that generates a control voltage to be supplied to another circuit based on a power supply voltage,
wherein the abnormality detection circuit is a voltage abnormality detection circuit that detects whether or not there is an abnormality in the power supply circuit based on whether or not the control voltage is within a predetermined voltage range, and
wherein the detection result communication unit includes an abnormality detection result generating unit which outputs the detection result indicating abnormality of the main circuit to the communication interface regardless of a detection result of the voltage abnormality detection circuit in the case where the detection result communication unit accepts the pseudo abnormal signal from the control device.

6. A motor control device comprising:
the control circuit according to claim 1; and
the control device,
wherein the control device outputs the pseudo abnormal signal to the pseudo abnormality generating unit, and determines whether or not there is an abnormality in the detection result communication unit based on the detection result output by the detection result communication unit.

7. A control circuit connected to a microcomputer, the microcomputer being configured to control a motor connected to a rotation shaft that is convertible into a turning angle of a turning wheel, the control circuit comprising:
a power supply circuit that generates a control voltage to be supplied to another circuit based on an input power supply voltage;
a counter circuit configured to calculate a rotation number indicating a rotational state of the rotation shaft based on a detection signal from a rotation angle sensor configured to detect a rotation angle of the motor as a relative angle;
a voltage abnormality detection circuit configured to detect whether or not there is an abnormality in the power supply circuit based on whether or not the control voltage is within a set predetermined voltage range, and generate a detection result;
a communication interface configured to output the detection result to the microcomputer; and
a built-in self-test (BIST) circuit configured to instruct the voltage abnormality detection circuit to set the detection result to be abnormal, regardless of whether the abnormality is actually present in the power supply circuit, in response to receiving a pseudo abnormal signal transmitted from the microcomputer,
wherein in a case where the BIST circuit accepts the pseudo abnormal signal from the microcomputer, the BIST circuit sets the detection result generated by the voltage abnormality detection circuit to be abnormal and causes the communication interface to output the detection result to the microcomputer.

8. The control circuit according to claim 7, wherein the BIST circuit is further configured to diagnose an abnormality in the voltage abnormality detection circuit based on output from the voltage abnormality detection circuit.

* * * * *